(12) United States Patent
Hidalgo Caruana

(10) Patent No.: US 11,952,914 B2
(45) Date of Patent: Apr. 9, 2024

(54) PROFILE FOR A TRAILING EDGE OF AN AIRFOIL AND METHOD TO REPAIR THEREOF

(71) Applicant: AIRBUS OPERATIONS, S.L.U., Madrid (ES)

(72) Inventor: Jaime Hidalgo Caruana, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 17/954,127

(22) Filed: Sep. 27, 2022

(65) Prior Publication Data
US 2023/0102672 A1 Mar. 30, 2023

(30) Foreign Application Priority Data

Sep. 28, 2021 (EP) .................................. 21382870

(51) Int. Cl.
*F01D 5/28* (2006.01)
(52) U.S. Cl.
CPC .......... *F01D 5/282* (2013.01); *F05D 2230/80* (2013.01); *F05D 2240/304* (2013.01)
(58) Field of Classification Search
CPC . F01D 5/282; F05D 2230/80; F05D 2240/304
See application file for complete search history.

(56) References Cited

U.S. PATENT DOCUMENTS

| 2,613,893 | A | 10/1952 | Young |
| 2010/0155528 | A1 | 6/2010 | Balsa Gonzalez et al. |
| 2014/0339370 | A1* | 11/2014 | De Gregorio Hurtado ................. B64C 3/20 244/35 R |
| 2021/0061491 | A1 | 3/2021 | Cheng et al. |

FOREIGN PATENT DOCUMENTS

| EP | 3 683 139 | 7/2020 |
| WO | 2016/060734 | 4/2016 |

OTHER PUBLICATIONS

The Extended European Search Report cited in EP21382870.0 dated Mar. 9, 2022, 9 pages.

* cited by examiner

*Primary Examiner* — Grant Moubry
*Assistant Examiner* — Ruben Picon-Feliciano
(74) *Attorney, Agent, or Firm* — Nixon & Vanderhye P.C.

(57) ABSTRACT

A profile for a trailing edge of an airfoil, the trailing edge including flanges, and the profile is U or V shaped, is made of composite material and includes: sections joined at a first profile end and defining an inner space, and recesses arranged along the two sections towards the inner space and complementary to each other between the two sections; wherein the profile is configured to follow a theoretical aerodynamic contour of the airfoil so that the two sections partially cover the trailing edge and the flanges are housed inside the inner space, and wherein each of the plurality of recesses defines at least two joining points through which the two flange of the trailing edge and the two sections are configured to be joined each other.

13 Claims, 8 Drawing Sheets

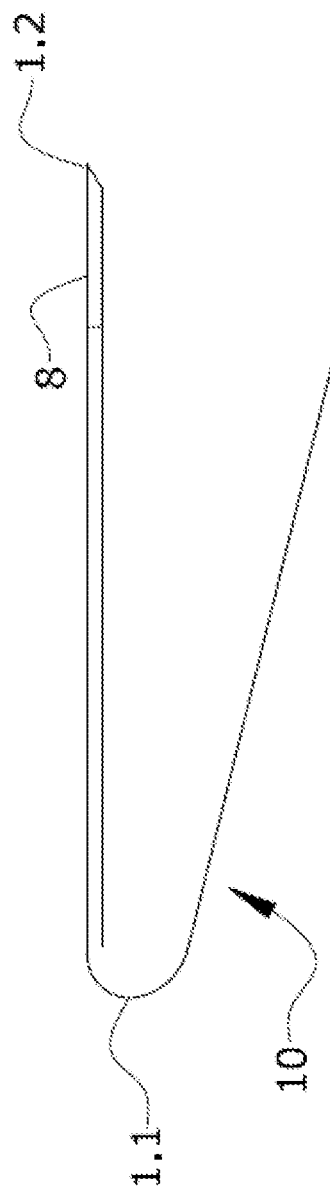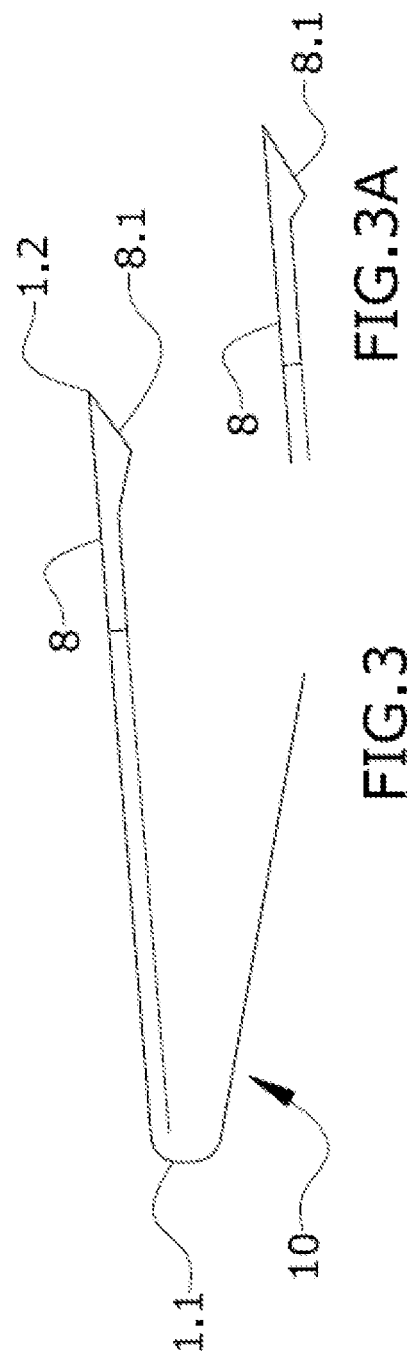

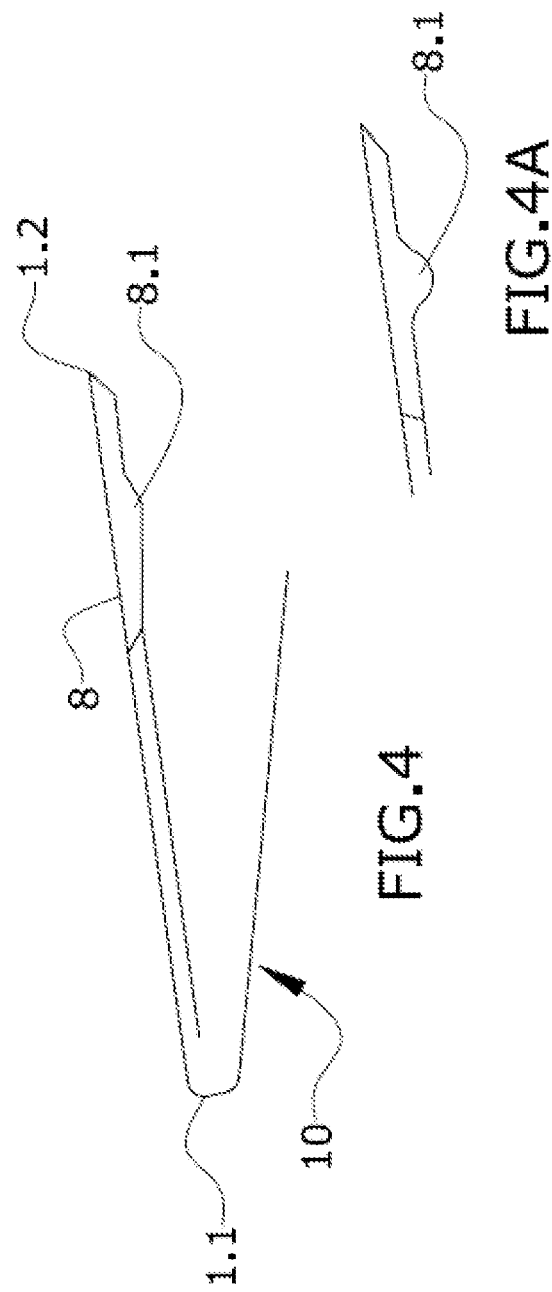

PROFILE FOR A TRAILING EDGE OF AN AIRFOIL AND METHOD TO REPAIR THEREOF

RELATED APPLICATION

This application incorporates by reference in its entirety and claims priority to European Patent Application EP 21382870.0, filed Sep. 28, 2021.

TECHNICAL FIELD

The present invention belongs to the field of aeronautical structures such as an aircraft airfoil. In particular, the profiles are coupled to a trailing edge of an aircraft airfoil. In addition, the present invention provides a method to repair a profile at a trailing edge of an aircraft airfoil.

BACKGROUND

Aircraft airfoils, such as horizontal tail plane (HTP), vertical tail plane (VTP), flaps, wings or ailerons, are often manufactured in two or more pieces, such as a lower piece and an upper piece. At the joint between the pieces, a U or V shaped profile is mounted to a trailing edge of the airfoil by rivets or sometimes by glue. The profile covers a space in the joint between these pieces and, particularly, at the trailing edge of the pieces of the airfoils. Typically, the profile applied to the trailing edge is a folded sheet of aluminum or steel. The profile with the U or V shape has a small thickness. The folded sheet has drilled holes used to attach the profile to the two pieces of the airfoil at the trailing edge. Rivets extend through the holes to fasten the profile to the pieces of the airfoil. By means of the profile, the joined pieces of an airfoil are protected against leaks and lightning.

Typically, the profile attach to pieces of an airfoil is a metallic profile parallel to a flange of the trailing edge joined to skins of the airfoil with rivets. In addition, sometimes a filler, i.e., epoxy, is added in the joint to reduce parasitic drag. The provision of a filler increases weight and manufacturing cost due to hand labor hours needed to apply the filler. Another drawback of using the filler is that the filler takes approximately 24 hours to cure, and the cured filler must be sanded and polished to make the profile follow the aerodynamic contour of the airfoil. Thus, time needed to apply a profile to the pieces is very long and requires many hours of operators, which affects the total cost of the completed airfoil.

Moreover, after the airfoil is subjected to flights, cracks may appear on the filler due to stresses caused by great changes in the atmosphere during flight of an aircraft. These cracks give a poor appearance to the airfoil.

If a filler is not added to the profile, the weight of the profile may be reduced but parasitic drag on the airfoil would increase and cause a corresponding increase in fuel consumption. Specifically, without the filler turbulence and disturbances would be caused in exit bores of aerodynamic profiles (airfoils) causing a parasite resistance and therefore increasing the fuel consumption of aircraft.

In current cases, a breakage or failure occurring in a profile of the airfoil needs to be repaired. To repair a breakage or failure requires disassembling one of the sections of the profile that joins the two pieces of the aerodynamic surface of the airfoil and replacing the profile. These profiles are normally large. Also, the filler must be removed to expose the rivets. Then, the rivets are all removed by drilling into the head of each rivet. There are usually many rivets due to the small pitch of separation between each two rivets. In case of failure in the profile, since the flanges of the airfoil are made of composite material, these flanges must be regrown to eliminate the deteriorated part of the flange due to the failure. Finally, before removing the profile, the sealant that seals the edge of the profile to the airfoil should be removed.

The presence of epoxy filler in the profile also has drawbacks in any maintenance or repair operation since the filler needs to be completely removed and repaired. This reparation of the filler implies the application of a new filler, curing, sanding, polishing, priming and painting the new filler at the profile. Therefore, this entails a great cost in operating time, and a cost losses since the plane cannot operate and therefore ceases to monetize.

The above profiles suppose a great inefficiency both in the production chain and in the method for repairing the profile. When an aircraft is undergoing repair due to a defect of this type means that the aircraft at least 24 hours need to be stopped to be repaired, and this leads to a high cost, both in repair time and losses since the aircraft is not operational.

SUMMARY OF INVENTION

The present invention may be embodied as a profile for an aircraft airfoil configuration to solve the drawbacks indicated above, and as a method to repair these profiles on an aircraft airfoil.

In a first inventive aspect, the present invention may be embodied as a profile for a trailing edge of an aircraft airfoil, the trailing edge comprising two flanges, and the profile is U or V shaped and is made of composite material.

An aircraft airfoil usually comprises a leading edge and a trailing edge opposed to the leading edge. The leading edge is at the front part of the airfoil, which is the portion that meets the external airflow first when as the airfoil is in atmospheric air flowing over an aircraft while flying. The trailing edge is at the back of the airfoil and is located axially downstream from the leading edge according to an airflow direction, e.g., a chordwise direction. In contrast, a spanwise direction extends from a root to a tip of an airfoil. Through the entire description, the "airflow direction" will be understood as the airflow direction that corresponds to the direction of the external airflow surrounding and flowing over the skin when the airfoil is in operating mode, e.g., an aircraft flying. The airflow direction extends from the leading edge to the trailing edge of the airfoil.

The airfoil is formed by two, or more, pieces. The pieces are joined along a joint starting at the leading edge and ending at the trailing edge. The trailing edge may include two flanges.

The profile has a U or V shape configured to abut or cover the trailing edge, and in particular the flanges of the trailing edge. The profile is configured to be coupled to the flanges of the trailing edge. That is, the profile is designed to be mounted on the trailing edge flanges to be coupled to them. Furthermore, the profile may be made of composite material.

The profile may comprise two sections joined at a first profile end and defining an inner space between the sections. A plurality of recesses are arranged on the two sections along a spanwise direction, are deflect towards the inner space and include pairs of recesses wherein each pair are two recesses each in a respective one of the sections and aligned along a direction perpendicular to both the spanwise and chordwise directions.

The profile may be a one-piece structural component including two sections that meet at a first profile end and extend in a chordwise direction to a second profile ends where the sections do not meet. The cross sectional shape of the profile may be a U or V shape. The profile may further comprise for each section a second profile end opposed to the first profile end, this second profile end being configured to be complementary to surfaces of a trailing edge of an airfoil. The first profile end is common for both sections of the profile while each section comprises a second profile end. These two sections defines an inner space between them and the first profile end. In particular, the inner space is further delimited by the second profile ends of the sections.

The profile further comprises a plurality of recesses located at both sections along a transversal direction that is transverse to the airflow direction. These recesses projects towards the inside of the profile, that is, towards the inner space. The recesses of one section are complementary with the recesses of the other sections, this means that each recess of a section is coincident with another recess of the other section according to a direction perpendicular to the airflow direction and the transversal direction.

The profile is configured to follow the theoretical aerodynamic contour of the airfoil so that the two sections partially cover the trailing edge and the flanges being housed inside the inner space.

The fact that this profile follows the theoretical aerodynamic contour of the aircraft airfoil means that when the profile is coupled to the airfoil in an operative mode, there is a superficial continuity between the surfaces of each profile section and the surfaces of the aircraft airfoil. When this superficial continuity is achieved, it is understood that the theoretical aerodynamic contour of the airfoil is extended to the included profile. The theoretical aerodynamic contour will be understood as the theoretical surface that surrounds an aerodynamic profile or airfoil. In an operative mode with the profile coupled to the airfoil, the flanges of the trailing edge are covered by the profiled and housed in the inner space of this profile, and the second ends of the profile are complementary to the surface of the trailing edge in order that there is surface transition between the profile and the trailing edge but rather a superficial continuity is achieved between them.

Each recess of the plurality of recesses defines at least two joining points through which the two flange of the trailing edge and the two sections are configured to be joined each other. In an operative mode, both trailing edge flanges and the two sections of the profile are joined together at these joining points by means of rivets.

The joining points are to be understood as a reference in the external surface of the profile and not as an additional structural component in the profile. For example, these joining points could be marked on the surface of the profile sections so that during the assembly of the profile to the airfoil, these points are taken as references to provide the rivets for the joining.

The present profile provides an improved profile that reduces parasitic drag and weight when is assembled to a trailing edge of an airfoil. The parasitic drag and weight reduction in turn leads to a cost and time of production reduction and operations and repairs reductions. These reductions are mainly achieved thanks to the configurations of the present profile that is provided with two sections which surfaces follows the theoretical aerodynamic contour of the airfoil to which the profile is to be coupled.

Compared to the known profiles in the prior art, the present profile reduces the joining points between the profile and the trailing edge of an airfoil only to the joining points arranges at the recesses of the profile. In addition, the fact that these joining points are located at the recesses hides the rivet heads from the aerodynamic contour of the profile and consequently of the entire airfoil. The recesses also provide stability to the profile which leads in reducing the use of filler or sealant between the profile and the wedged of the airfoil to which the profile is to be coupled.

Since the present profile provides a weight reduction by itself and when it is coupled to an airfoil, the flutter effect is therefore also reduced. Flutter is an aerodynamic vibration induced from a control surface that can lead to total structural failure in the airfoil. Thus, with the present profile weight is eliminated from the rear area (trailing edge) of the airfoils, which entails a remove of floating masses in the trailing edge of the airfoils, and therefore this improves the behavior against flutter effect, thus reducing the provision of this phenomenon comparing to the prior art solution.

The use of composite material for the manufacturing of the profile provides a thermal loads reduction compared with the metallic profile of the prior art. This is due to the material of the profile is the same material (composite material) as that of the airfoil and its trailing edge, and therefore the dilatation of both components profile and airfoil will be the same since both would behave the same way.

Moreover, the present profile reduce or eliminate the use of filler or sealant and this leads in a cost savings and in reduction of application time. Specifically, the provision of filler or sealant requires approximately 24 hours to cure and then needs to be sand and polished in order to ensure the aerodynamic contour. Therefore, the reductions of filler or sealant is an advantages over time, costs and operators work. Additionally, this also provides a weight decrease for the airfoil and thus a fuel and environmental cost reduction.

Since the present profile avoids drag and comprises a lower weight compared to the prior art solutions, this results in a reduction in consumption preflight hour for the aircraft, thus eliminating environmental unnecessary expense and increasing the range of aircraft or its payload.

In a particular embodiment, each section comprises a support section configured to rest on the trailing edge. This support section corresponds to the second profile end that is opposed to the first profile end. That is, the support section of the profile will be understood as the portion of the profile that rests on the trailing edge of the airfoil when the profile is in an operative mode coupled to the airfoil.

In a more particular embodiment, the support section comprises at least a projection that projects towards the inner space and is configured to couple and sealant the profile to the trailing edge. The projection protrudes beyond the thickness of the profile and is intended to rest on the trailing edge of the airfoil. The profile with such projections at the support section are provided for a better sealant and attachment between the profile and the airfoil. In an embodiment, the support section comprises a plurality of projections.

In a more particular embodiment, the projection has a triangular and/or circular shape according to a cross sectional view of the profile. This cross sectional view of the profile corresponds to a cross sectional plane of the profile that comprises que airflow direction and is transversal to the first profile end.

In a particular embodiment, the projections are located at a second profile end opposed to the first profile end and/or before the second profile end of the sections. That is, the projection can be arranged close to the edge of the profile at its second profile end or slightly away from this profile edge. By having the projections at the second profile end or very close to it, these projections help sealing the profile to the trailing edge or act as a stop on the trailing edge. In a particular example, the profile is machined at its end or close to it to provide space for the projection and thus guarantee a better coupling and closure of the profile to the trailing edge.

In a particular embodiment, the recesses are boxed swaging recesses. This particular configuration of recesses provides to the profile more stability thus avoiding the excessive use of filler or sealant between the profile and the airfoil and the drawbacks that this present. In a more particular embodiment, the recesses comprises a rest surface that is parallel to the surface of the trailing edge flanges.

In a particular embodiment, the profile is made of reused or scrap composite materials. The reused or scrap material can be the same material that is used for the manufacture of the same components as other parts or other aircraft programs. This supposes a reuse of a material very expensive as carbon fiber can be and a great impact on the environment. In this sense, a great advantage is provided since it is reused a material with very good mechanical properties that was going to be wastes, which entails a very low cost of material for the production of the present profile.

In a particular embodiment, the distance between the joining points of recesses are predefined distances according to the airfoil which the profile is configured to couple, so that each distance defines at least a predefined pattern of a profile portion.

Since the present profile is configured to advantageously fit in any part of the airfoil to be attached, the dimensions of the profile change according to each airfoil. For example, the pitch of joining points or the distance between joining points are determined for each airfoil to which the profile is coupled. Therefore, a distance between two joining points of the recesses represents a predefined patter that corresponds to a portion of the profile. That is, it is understood that the profile is conform by several portions defined by a parameter that corresponds to the distance between two joining points.

In a second inventive aspect, the present invention may provide a trailing edge of an airfoil, the trailing edge comprising: two flanges arranged at an end of the trailing edge, a profile according to the first inventive aspect, a plurality of first rivets arranged at the joining points of the profile for attaching both flanges to the sections of the profile, and a plurality of second rivets arranged between the recesses of the profile for attaching the flanges between them.

The trailing edge may comprise another joining points where the flanges are attached together by means of second rivets. The length of the first rivets is greater than the length of the second rivets. These another joining points are distributed along the surface of the flanges.

In a particular embodiment, the trailing edge further comprising a filler or sealant where the second profile ends touch the trailing edge. Particularly, the filler or sealant is provided along the completed second profile end between this end and the trailing edge. The provision of the filler or sealant guarantees good sealing and water tightness between the profile and the trailing edge. In another particular embodiment, the invention provides filler or sealant between the profile and the recesses also for improve the sealing and the water tightness between them.

(a) In a third inventive aspect, the present invention may be embodied as a method to repair a trailing edge profile according to the second inventive aspect, the method comprising the following steps: identifying at least a damage on the profile, cutting the profile according to a predefined pattern of a profile portion where the damage is provided, removing the cut profile portion with the damage, providing another profile portion that follows the same predefined pattern as the profile portion that has been removed, and attaching the new profile portion to the trailing edge to obtain a trailing edge with a repaired profile.

Once the damage has been identified on the profile, then a portion of the profile including the damage is cut from the rest of the profile. This profile portion is already predefined for the manufacture of the profile. That is, depending on where the damage is found in the profile, this region of the profile will corresponds to a profile portion that follows a predefined pattern. Since the dimension of the profile portion to be cut is predetermined, another profile portion without damage is provided that will replace the damaged profile portion. This predefined pattern refers to the dimension of a profile portion according to a predefined distance between joining points of recesses. Therefore, the damaged portion of the profile is replaced by another one without damage and with the same size as the damaged portions.

The present method allows a faster and easier profile repairs compared to the prior art solution since fewer rivets are needed to be removed and riveted from the profile. Therefore, this method is faster and more efficient to the previous and provides a reduction of the number of operator hours and time on ground of the aircraft.

Furthermore, although the spare portions have large dimension compared as the ones to be replaces, each spare portion may comprise several sub-portions that also follows a predefined pattern. In this case, the spare portion can be cut before be installed in order to be adjusted to the dimension of the damaged portion to be replaced.

A method embodying the invention may reduce repair time by more than 80% thanks to the new profile configuration that facilitates the reparation of the same.

In a particular embodiment, the step of cutting the profile is performed by cutting the profile from a recess to another recess including at least one joining point and the first rivet of each recess. The profile portion to be cut extends from one recess to another including at least one first rivet for each recess. Advantageously, the method only needs to remove at least two first rivets corresponding to the portion to be cut.

In a particular embodiment, the step of attaching the new profile is performed by riveting the first rivets on the joining points of the profile. Furthermore, the method may comprise applying a sealant or filler on the edge of the new profile portion.

In a forth inventive aspect, the invention may provide an aircraft comprising an airfoil with a trailing edge according to the second inventive aspect.

In a particular embodiment, the airfoil may be a horizontal tail plane, a vertical tail plane, flap, wing, elevator, rudder or aileron.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 2 shows a schematically cross sectional view of a profile according to an embodiment of the present invention.

FIG. 3 shows a schematically cross sectional view of a profile according to an embodiment of the present invention.

FIG. 3A shows a schematically cross section view of a detail of a profile according to an embodiment of the present invention.

FIG. 4 shows a schematically cross sectional view of a profile according to an embodiment of the present invention.

FIG. 4A shows a schematically cross section view of a detail of a profile according to an embodiment of the present invention.

FIGS. 8 and 8A show a schematically view of the reparation of a damaged profile according to according to an embodiment of the present invention.

DETAILED DESCRIPTION

Figure 1:
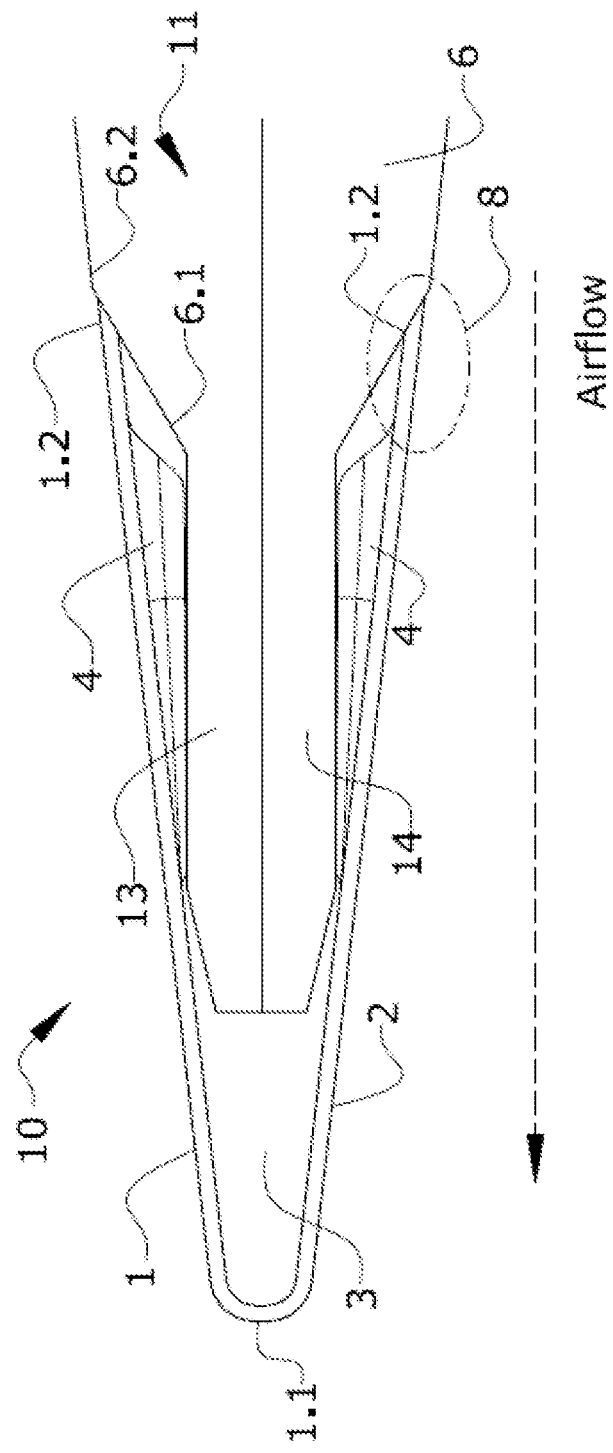
FIG. 1 shows a schematically cross sectional view of a trailing edge with a profile according to an embodiment of the present invention.
Figure 9:
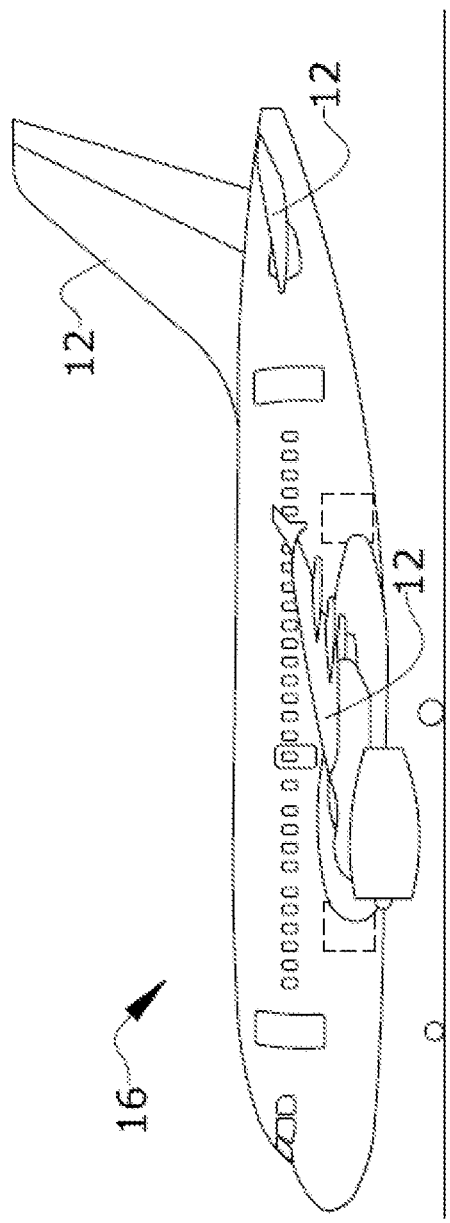
FIG. 9 shows an aircraft according to an embodiment of the present invention.

FIG. 1 shows a schematically cross sectional view of a profile (10) attached to the trailing edge (11) of an airfoil (12—FIG. 9). The trailing edge (11) comprises two flanges (13, 14) one arranged on top of the other according to the airflow direction. The profile (10) has a U-shaped configuration and comprises two sections (1, 2) that are joined or connected at the first profile end (1.1). This profile (10) defines an inner space (3) between the sections (1, 2) in which the flanges (13, 14) of the trailing edge are housed.

The profile (10) shown in FIG. 1 includes, for each section (1, 2), a recess (4) that projects towards the inner space (3). Each recess (4) projects inward from the outer surface of the section (1, 2). Each recess is configured to rest on, e.g., abut, a surface of a flange (13, 14). As it can be observed, a pair of recesses (4) is aligned along a line perpendicular to an axis (1.3) of the profile. In each pair, one recess is on section (1) and the other is on sections (2). Each recess (4) comprises two joining points (5—FIGS. 5A, 5B), e.g., apertures, in each of the recesses (4). At the joining points, the profile (10) surface and the two flanges (13, 14) are attached together by means of first rivets (15.1). Each recess may have a pair of first rivets arranged along a spanwise direction of the profile. The first rivets extend from one section (1) of the profile to another section (2), and extend through the flanges (13, 14) of the trailing edge, each recess in section (1) has a corresponding recess in section (2) aligned along a direction perpendicular to the axis (1.3) of the profile. Thus, the recess in each pair of complimentary recesses are one in section (1) and the other in section (2) and are aligned along a line perpendicular to the axis (1.3).

The profile (10) further comprises a second profile ends (1.2) in each section (1, 2). The second profile ends (1.2) are at an area of the profile (10) that contacts with the trailing edge (11). The trailing edge (11) also comprises a variable thickness portion (6) with a ramp-shaped surface that comprises two sections, a first surface section (6.1) having a greater inclination than the second surface section (6.2). As it can be observed in FIG. 1, the second profile end (1.2) rests, e.g., abuts, on the first surface section (6.1) of the trailing edge (11). In particular, a support structure (8) of the profile (10) includes the second profile end (1.2) and rests on the trailing edge (11). The rest of the profile (10) on the trailing edge (11) provides a surface continuity between the second surface section (6.2) of the trailing edge (11) and the surface of the profile (10) at each section (1, 2), and therefore the profile (10) partially covers the trailing edge (11). In particular, the second profile ends (1.2) comprise a configuration that is complementary to the surface of the trailing edge (11), thus achieving the profile (10) to follow the theoretical aerodynamic contour of the airfoil (12).

Specifically, the recesses (4) support on a surface of the flanges (13, 14) that is parallel to the airflow direction, and therefore, each recess (4) has a base surface intended to be parallel to the airflow direction.

In a particular embodiment, the profile (10) is made of composite materials, and preferably, reused or scrap composite materials.

FIGS. 2, 3, 3A, 4 and 4A show a schematically profile (10) as shown in FIG. 1 with different embodiments for the configuration at its support sections (8). According to FIG. 2, the support section (8) has the same thickness as the rest of the profile (10) or the respective section (1, 2). That is, in this case the support section (8) is a continuation of the profile sections (1, 2). On the other hand, FIGS. 3, 3A, 4 and 4A shows a profile (10) where the support section (8) comprises at least one projection (8.1) projecting towards inside the profile (10), that is, towards the inner space (3). This projections (8.1) coupled and optionally sealant the profile (10) to the trailing edge (11). Specifically, the projections (8.1) is in contact with the surface of the trailing edge (11) when the profile (10) is in an operative mode coupled to the trailing edge (11).

As it can be observed, the projection has a triangular and/or circular shape in cross section. In particular, FIGS. 3, 3A and 4 show a projection (8.1) each with a different triangular shape. On the other hand, FIG. 4A shows a projection (8.1) with a half-circular shape in cross section. The projection can be understood as an independent protrusion for each section or that can be repeated along the profile for each section, or as a continuous protruding element along the profile for each section.

Figure 5A:
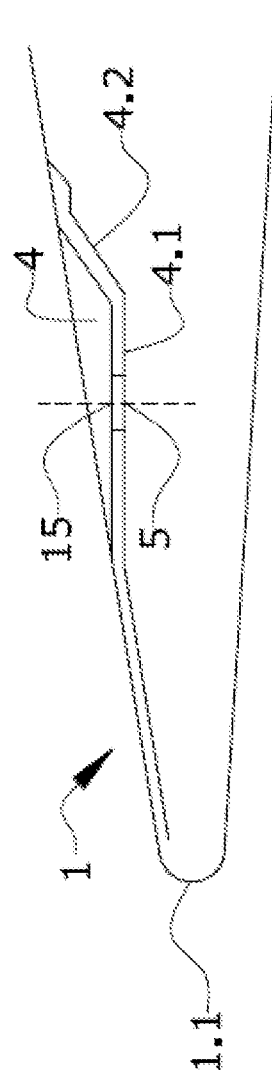
FIG. 5A shows a schematically cross sectional view of a profile section according to an embodiment of the present invention.
Figure 5B:
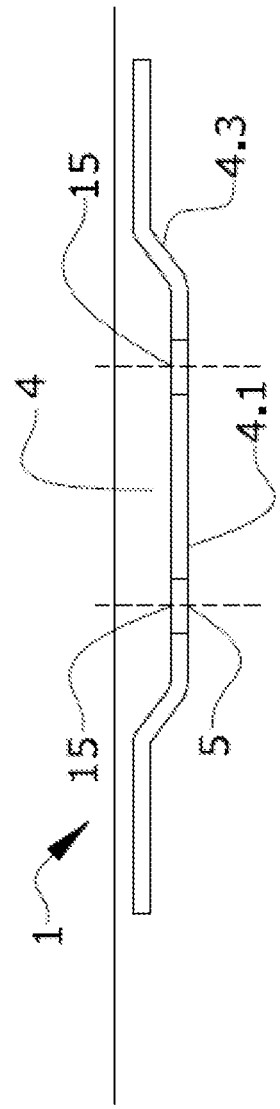
FIG. 5B shows a schematically cross sectional view of the profile section of FIG. 5A.

FIGS. 5A and 5B show two different cross sectional views of one section (1) of a profile (10) as the previous ones with a boxed swaging recess (4). As it can be observed on FIG. 5A, the recess (4) comprises a base surface (4.1) and a ramp surface (4.2), both surfaces (4.1, 4.2) of the recess (4) are a continuation of the surface of a section (1). The base surface (4.1) is intended to rest on a flange (13, 14) surface of a trailing edge (11), therefore the base surface (4.1) is parallel to the flange (13, 14) surface. This recess (4) shows a hole (15) located on a joining point (5) of the recess (4) for allowing to rivet the profile (10) to the trailing edge (11) by means of first rivets (15.1—FIG. 1). FIG. 5B shows a recess (4) comprising two holes (15) on the base surface (4.1), each hole (15) arranged at a joining point (5) of the profile (10). Additionally, as it can be observed on FIG. 5B, this recess (4) comprises two ramp lateral surfaces (4.3).

Figure 6:
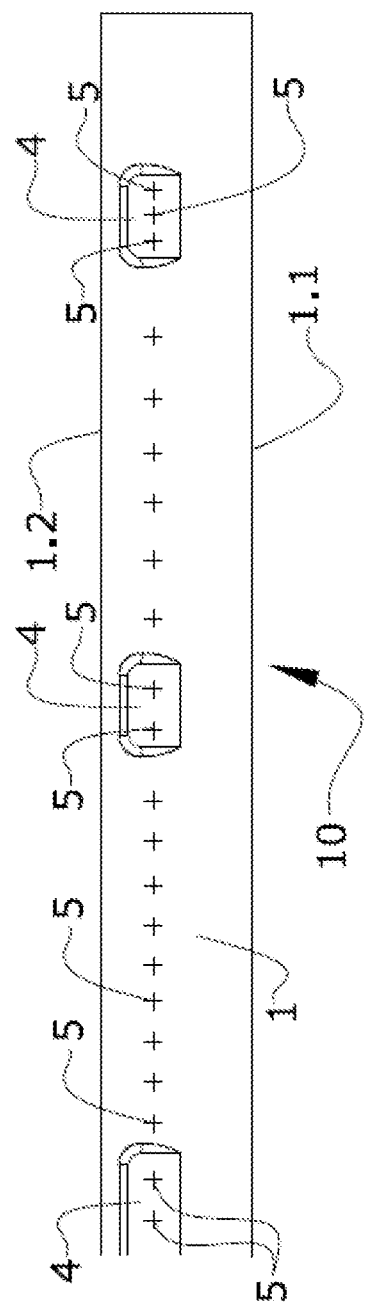
FIG. 6 shows a schematically plan view of a profile portion according to an embodiment of the present invention.

FIG. 6 shows a profile (10) portion according to a plan view where it can be observed three recess (4), one these recesses (4) comprises two joining points, another recess (4) comprises three joining points (5), and the last one comprises four joining points (5) but only two are represented on the figure. These joining points (5) represent the location where the profile (10) is attached to the trailing edge (11) by riveting first rivets. Furthermore, the flanges (13, 14) of the trailing edge (11) are attached together by means of second rivets in a joining points distributed along the surface of the flanges (13, 14) so that being located between the recesses (4) when the profile (10) is assembled to the trailing edge (11). Specifically, this FIG. 6 shows these joining points between flanges where the second rivets would be riveted just for the purpose of showing where they would be arranged, clarifying that these are not on the profile (10).

Figure 7:
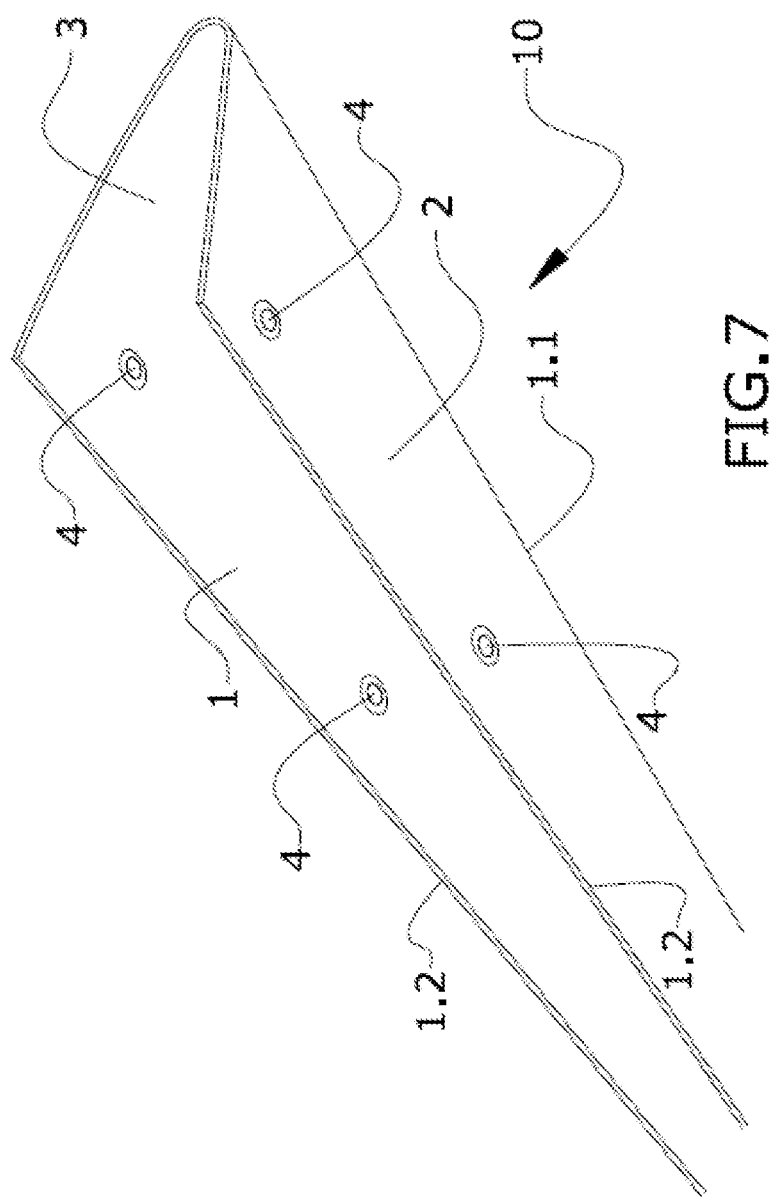
FIG. 7 shows a schematically perspective vie of a profile according to according to an embodiment of the present invention.

FIG. 7 shows a perspective view of a profile (10) made of composite material and comprises a first (1) and second (2) section joined at a first profile end (1.1) which configure a U-shaped profile (10). This profile (10) shows two recesses (4) for each section (1, 2) being coincident between sections (1, 2) according to a vertical direction through which the first rivets attach the profile (10) to the trailing edge (11).

FIG. 9 shows an aircraft (16) comprising airfoils or lifting surfaces (12) such as wings, horizontal tail plane or vertical tail plane. These airfoils or lifting surfaces (12) comprising a profile (10) as already described above attached to the trailing edge (11) of such airfoils (12).

A method to repair a profile (10) once it is assembled to a trailing edge (11) as described above. This method may comprises the following steps:
(a) identifying at least a damage (7) on the profile (10),
(b) cutting the profile (10) according to a predefined pattern of a profile portion (9) where the damage (7) is provided,
(c) removing the cut profile portion (9) with the damage (7),
(d) providing another profile portion (9) that follows the same predefined pattern as the profile portion (9) that has been removed, and
(e) attaching the new profile portion (9) to the trailing edge (11) to obtain a trailing edge (11) with a repaired profile (10).

Figure 8:
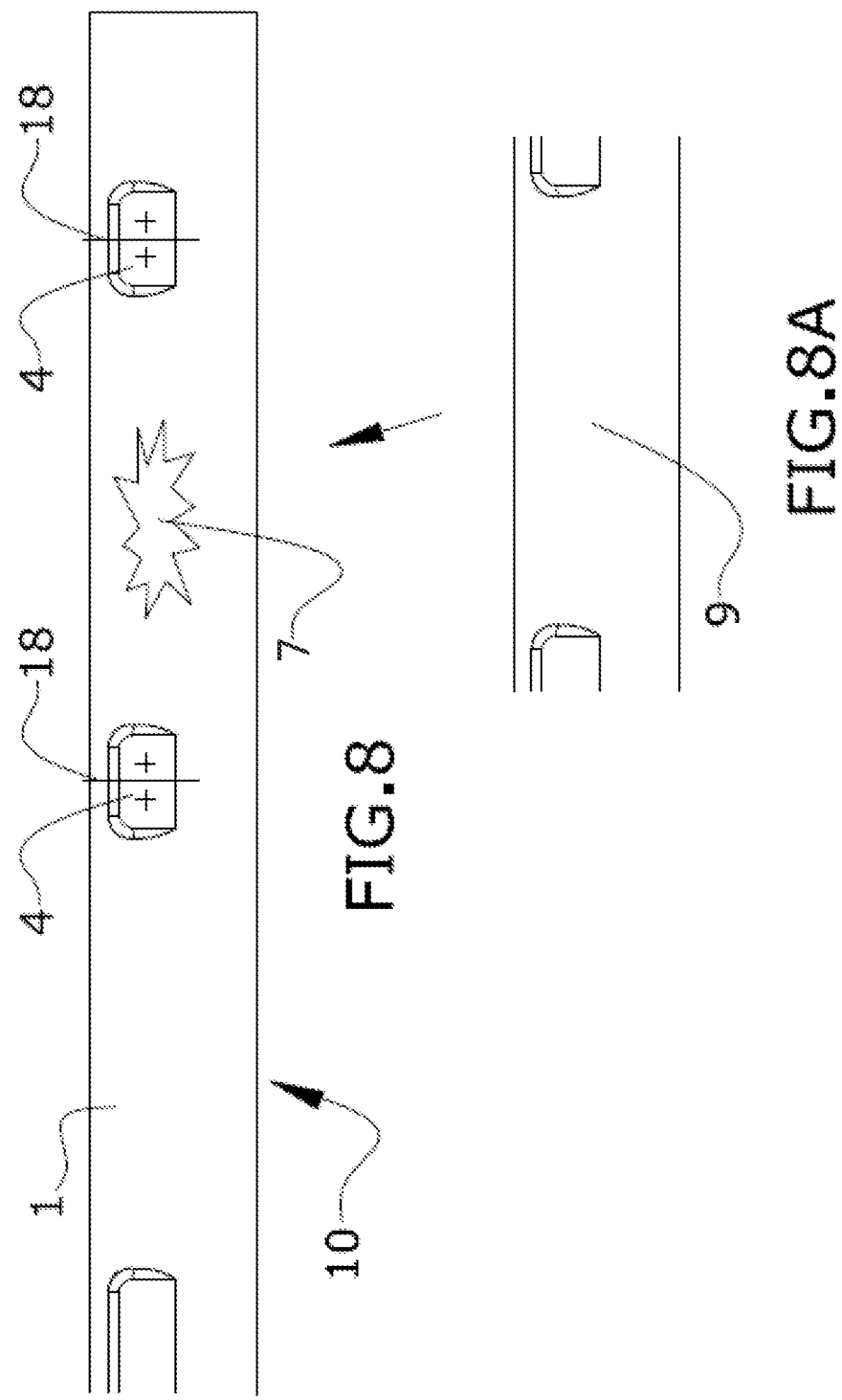

Once the damage (7) has been identified on the profile (10) in step (a), a profile portion (9) including the damage (7) is cut according to step (b). This profile portion (9) corresponds to a predefined pattern. Specifically, this predefined pattern is provided by the distance between joining points (5) of the recesses (4). That is, the dimension of the profile portion (9) to be cut has already predefined according to the airfoil (12) which the profile (10) is to be coupled. As it can be shown on FIG. 8, the profile portion (9) with the damage (7) is cut between two adjacent recesses (4) including a joining point (5) for each recess (4). The cutting lines (18) are also shown in this FIG. 8.

After cutting the profile (10) in step (b), the method comprises the step (c) of removing such damaged profile portion (9) already cut and replacing this damaged profile portion (9) by a new profile portion (9) with the same predefined patterns as the damaged portion. That is, in step (d) another profile portion (9) with the same dimensions as the profile portion (9) already removed is provided (as it shown on FIG. 8A) to be attached according to the last step (e) of the method.

The replacement profile portion (9) is attached to the trailing edge (11) to an airfoil (12) with a repair profile (10) according to step (e). This attachment only requires riveting a first rivet in each joining point (5) of each recess (4) of the replacement profile portion (9) to the trailing edge (11) of an airfoil (12). In a particular example, a filler or sealant can be also applied between the second profile ends (1.2) of the replacement profile portion (9) and the trailing edge (11).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A profile for a trailing edge of an airfoil, the trailing edge includes two flanges, the profile is U or V shaped in cross-section and is made of composite material, the profile comprises:
two sections joined at a first profile end and defining an inner space, and
a plurality of recesses arranged along the two sections arranged towards the inner space and the recesses are arranged complementary to each other between the two sections;
wherein the profile is configured to follow an aerodynamic contour of the airfoil so that, when the profile is mounted on the trailing edge, the two sections partially cover the trailing edge of the airfoil and the two flanges of the airfoil are housed in the inner space,
wherein each of the plurality of recesses defines at least two joining points through which the two flanges of the trailing edge and the two sections are configured to be joined;
wherein each of the two sections includes a support section configured to rest on the trailing edge; each of the support sections includes at least one projection projecting towards the inner space and the at least one projection is configured to abut the trailing edge and the at least one projection has in cross section a triangular shape or a semi-circular shape.

2. The profile according to claim 1, wherein the projection is located at a second profile end opposed to the first profile end and/or before the second profile end of the sections.

3. The profile according to claim 1, wherein each of the plurality of the recesses is a boxed swaging recess.

4. The profile according to claim 1, further comprising for each of the two sections a second profile end opposed to the first profile end, wherein the second profile end is configured to be complementary to a surface of the trailing edge.

5. The profile according to claim 1, wherein the profile is made of reused or scrap composite materials.

6. The profile according to claim 1, wherein distances between the joining points of recesses are predefined distances according to the airfoil which the profile is configured to couple and each of the distances defines at least a predefined pattern of a profile portion.

7. The trailing edge of an airfoil, the trailing edge comprising:
two flanges arranged at an end of the trailing edge,
the airfoil according to claim 1,
the trailing edge further comprising:
a plurality of first rivets arranged at the joining points of the profile and configured to attach both of the two flanges to the sections of the profile, and a plurality of second rivets arranged between the recesses of the profile and configured to attach the flanges of the trailing edge between them.

8. The trailing edge according to claim 7, further comprising a filler or sealant where a second profile end touches the trailing edge.

9. A method to repair a trailing edge profile according to claim 7, the method comprising the following steps:
identifying at least a damage on the profile,
cutting the profile according to a predefined pattern of a profile portion where the damage is provided,
removing the cut profile portion with the damage,
providing another profile portion that follows the same predefined pattern as the profile portion that has been removed, and
attaching the another profile portion to the trailing edge to obtain a trailing edge with a repaired profile.

10. The method according to claim 9, wherein the step of cutting the profile is performed by cutting the profile from a recess to another recess including at least one joining point and the first rivet of each recess.

11. An aircraft comprising the airfoil with the trailing edge according to claim 10.

12. The aircraft according to claim 11, wherein the airfoil is a horizontal tail plane, a vertical tail plane, flap, wing, elevator, rudder or aileron.

13. An airfoil assembly comprising:
a profile panel extending in a spanwise direction of the airfoil and having in cross section a U-shape or a V-shape, wherein the profile panel includes a panel outer surface configured to be exposed to the airflow;
an airfoil including an upper outer surface and a lower outer surface each configured to be exposed to airflow, and upper and lower trailing edge flanges extending aft of the upper and lower outer surfaces in a direction of the airflow, wherein the upper and lower trailing edge flanges extend into an inner space defined by the profile panel;
a first row of recesses on the profile panel projecting inward towards the inner space, abutting the upper trailing edge flange and arranged along the spanwise direction, wherein each recess of the first row abuts and is joined to the upper trailing edge at least at two points;
a second row of recesses on the profile panel projecting inward towards the inner space, abutting the lower trailing edge flange and arranged along the spanwise direction, wherein each recess of the second row abuts and is joined to the lower trailing edge at least at two points;
the profile panel includes an upper edge and a lower edge each facing into the airflow along a chordwise direction of the airfoil, wherein the upper edge of the profile panel is aligned with and adjacent a rear edge of the upper outer surface of the airfoil and the lower edge of the profile is aligned with and adjacent a rear edge of the lower outer surface of the airfoil;
the profile panel includes an upper support section which includes the upper edge and a first projection extending inwards towards the inner space and abutting the upper trailing edge flange proximate the rear edge of the upper outer surface, wherein the first projection has a semicircular shape or a triangular shape in cross section along the direction of the airflow and the first projection is forward of the first row of recess, and the profile panel includes a lower support section which includes the lower edge and a second projection extending inwards towards the inner space and abuts the lower trailing edge flange proximate an aft edge of the lower outer surface, wherein the second projection has a semicircular shape or a triangular shape in cross section along the direction of the airflow and the second projection is forward of the second row of recess.

\* \* \* \* \*